United States Patent [19]
Paczonay

[11] Patent Number: 5,927,565
[45] Date of Patent: Jul. 27, 1999

[54] VENTED VALVE ASSEMBLY FOR LIQUID CONTAINERS

[76] Inventor: Joseph R. Paczonay, P.O. Box 1494, Campbell, Calif. 95009-1494

[21] Appl. No.: 08/857,917

[22] Filed: May 16, 1997

[51] Int. Cl.$^6$ ........................................................ B67D 3/00
[52] U.S. Cl. ............................................. 222/484; 222/525
[58] Field of Search ................................. 222/481.5, 484, 222/525, 532, 211

[56] References Cited

U.S. PATENT DOCUMENTS

| | | |
|---|---|---|
| 1,296,341 | 3/1919 | Towle . |
| 3,117,701 | 1/1964 | Stull . |
| 3,257,036 | 6/1966 | Micallef . |
| 3,521,784 | 7/1970 | Gaines et al. . |
| 4,000,685 | 1/1977 | Montalvo, Jr. . |
| 4,102,476 | 7/1978 | Loeffler . |
| 4,120,414 | 10/1978 | Harrison et al. . |
| 4,159,790 | 7/1979 | Bailey . |
| 4,262,671 | 4/1981 | Kersten . |
| 4,340,157 | 7/1982 | Darner . |
| 4,420,101 | 12/1983 | O'Neill . |
| 4,474,314 | 10/1984 | Roggenburg, Jr. . |
| 4,506,809 | 3/1985 | Corsette . |
| 4,513,891 | 4/1985 | Hain et al. . |
| 4,696,320 | 9/1987 | Bull . |
| 4,766,628 | 8/1988 | Walker . |
| 4,807,785 | 2/1989 | Pritchett ................................... 222/525 |
| 4,852,781 | 8/1989 | Shurnick et al. . |
| 4,903,742 | 2/1990 | Gagnon . |
| 4,997,429 | 3/1991 | Dickerhoff et al. . |
| 5,033,654 | 7/1991 | Bennett ..................................... 222/484 |
| 5,033,655 | 7/1991 | Brown . |
| 5,037,005 | 8/1991 | Appleby et al. . |
| 5,065,909 | 11/1991 | Pino et al. . |
| 5,143,236 | 9/1992 | Gueret . |
| 5,169,035 | 12/1992 | Imbery, Jr. . |
| 5,215,231 | 6/1993 | Paczonay . |
| 5,238,153 | 8/1993 | Castillo et al. .......................... 222/484 |
| 5,301,860 | 4/1994 | Paczonay . |
| 5,328,061 | 7/1994 | Libit et al. . |
| 5,348,179 | 9/1994 | Walker . |
| 5,431,205 | 7/1995 | Gebhard . |
| 5,454,486 | 10/1995 | Mack et al. . |
| 5,454,489 | 10/1995 | Vesborg . |
| 5,458,274 | 10/1995 | Maietta . |
| 5,472,120 | 12/1995 | Stebick et al. ........................... 222/525 |
| 5,472,122 | 12/1995 | Appleby . |
| 5,499,654 | 3/1996 | Shefte . |
| 5,529,213 | 6/1996 | Mack et al. . |

FOREIGN PATENT DOCUMENTS 461065  12/1991  European Pat. Off. ............... 222/525

*Primary Examiner*—Philippe Derakshani
*Attorney, Agent, or Firm*—Thomas R. Lampe

[57] ABSTRACT

Valve assembly having a base with an outlet opening for egress of liquid from a container and a vent hole for ingress of air into the container, a valve member movable between open and closed positions relative to the base for controlling passage of liquid through the outlet opening and covering the vent hole when the valve member is in the closed position, and a resiliently deformable sealing member which allows air to pass through the air hole when pressure within the container is less than pressure outside the container.

17 Claims, 15 Drawing Sheets

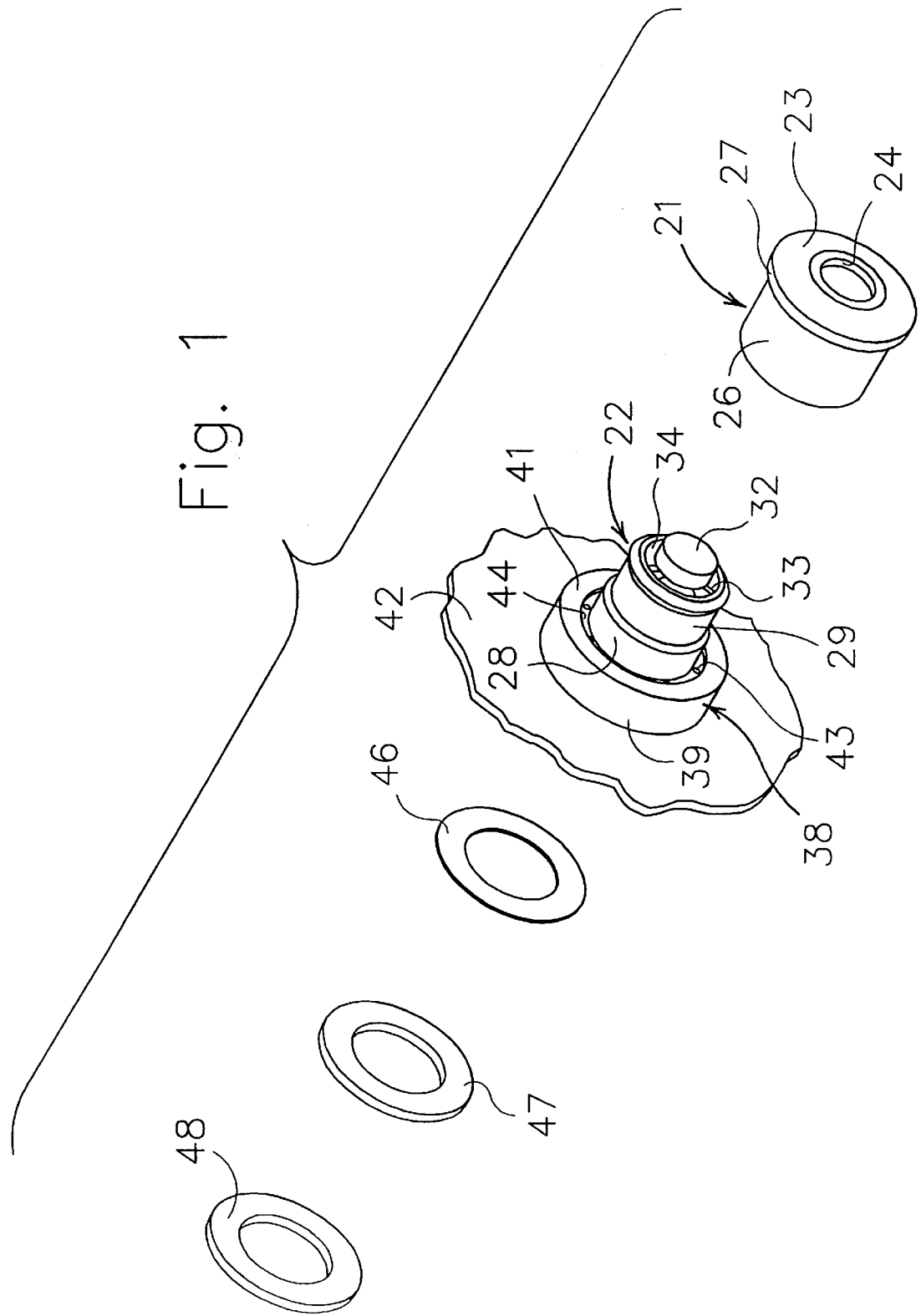

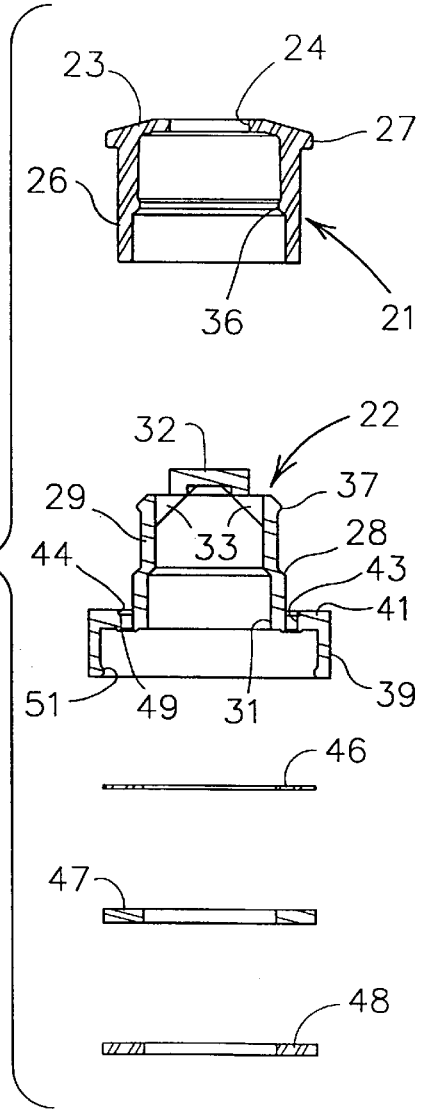
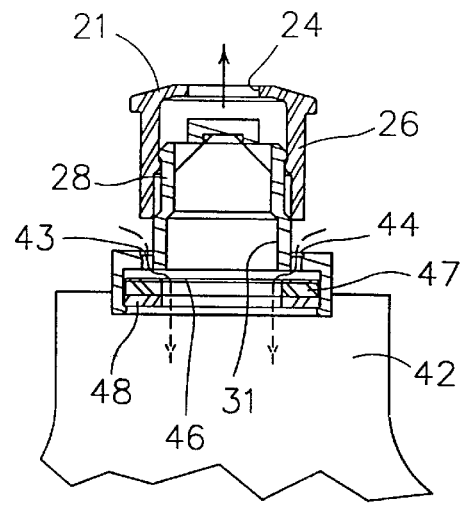
Fig. 3A
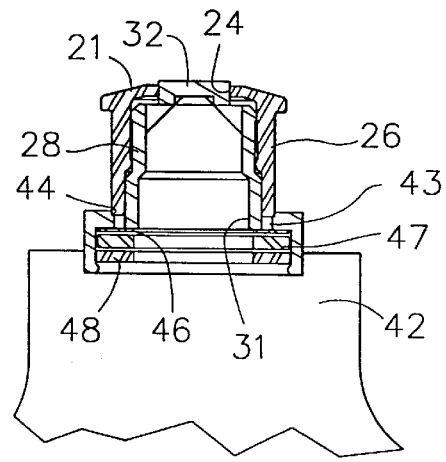
Fig. 3B

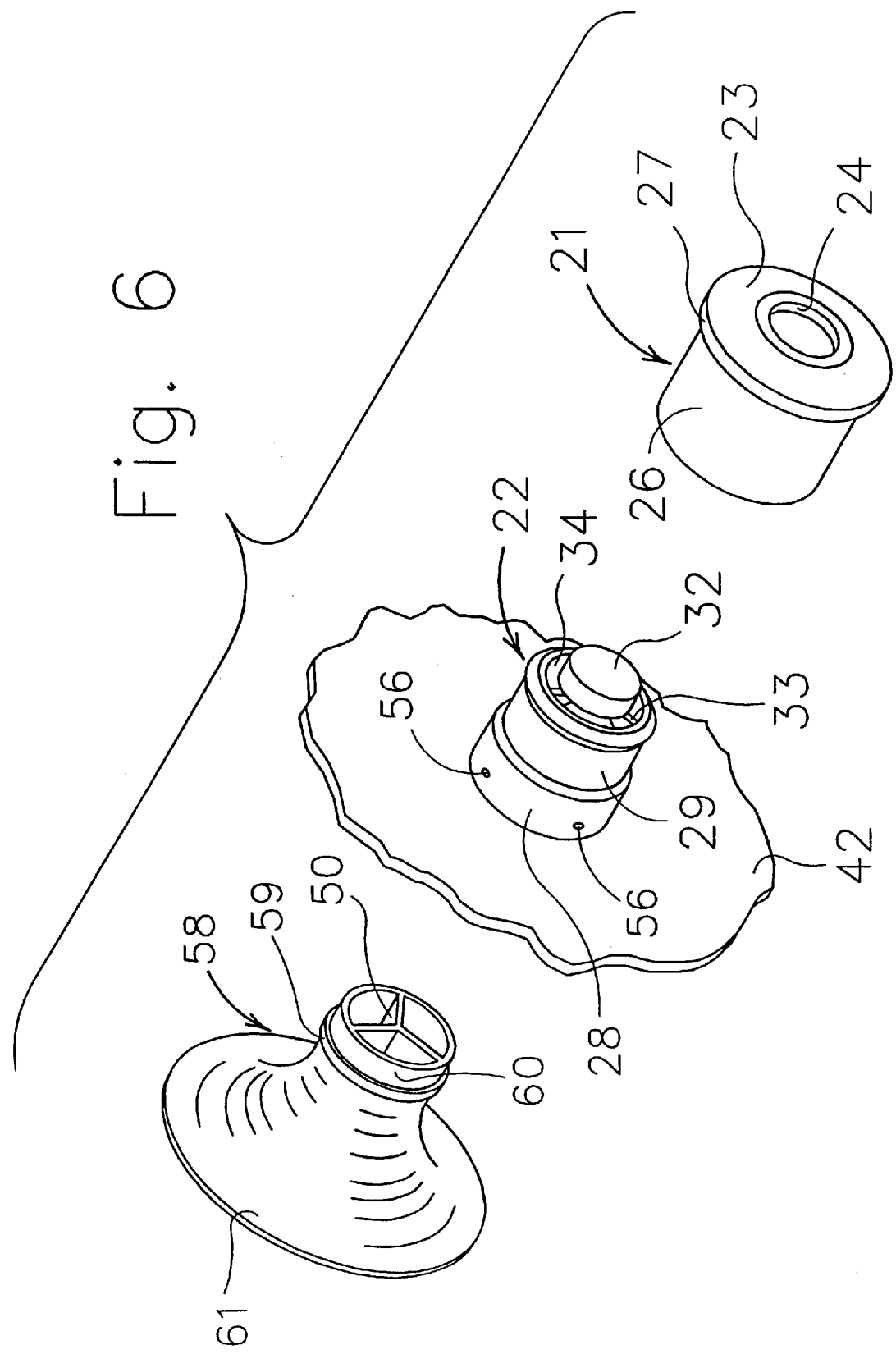

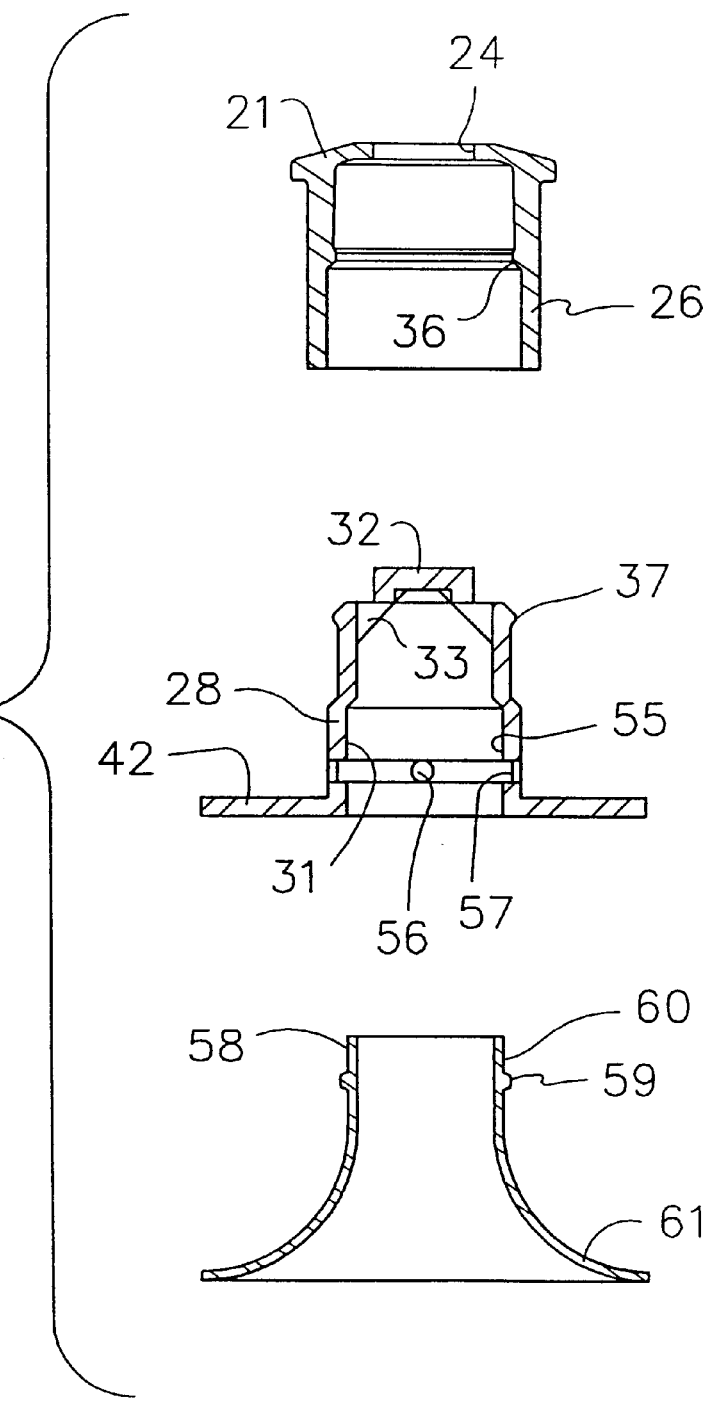

VENTED VALVE ASSEMBLY FOR LIQUID CONTAINERS

BACKGROUND OF THE INVENTION

1. Field of Invention

This invention pertains generally to liquid containers such as bottled water containers or bicycle water bottles. In particular, this invention relates to dispensing valves for use on such containers, wherein the dispensing valve provides for a closed position and two open positions with the added feature of allowing for improved ingress of air into the container thus providing containers that deliver fluid more efficiently than existing water bottles.

2. Background Art

Containers for bottle water and bicycle water bottles that are currently produced normally consist of the container and a dispensing cap with a push-pull valve. The push-pull valve has an open and a closed position. These containers and caps require the container to be inverted. Then the fluid is expelled by deforming the container. When the deforming force is removed from the walls of the container, it returns to the nondeformed shape. In this process, air enters through the same passage that fluid exits. So to drink with this arrangement, the user must constantly squeeze and release the container.

To allow for continuous flow, a better arrangement would be to have a valve cap that allows air into the container while fluid is exiting. Further improvement could be made by allowing the user to drink from a container that is either in an inverted position or in an upright position.

Many cap and container inventions have been disclosed that allow air back into the container by various valve and passage arrangements.

For example, U.S. Pat. No. 4,102,476 discloses a squeeze bottle with an air inlet valve. To allow fluid flow with this patent, the container must be in an upright position. Fluid is made to flow by deforming the sides of the container thus continuous fluid flow is prohibited. Built into the exit port of the cap are multiple apertures that cause the exiting fluid to be dispensed in a spray that is nondirectional. This makes it difficult to drink from the container or direct the exiting fluid stream at a specific location. Additionally, the diaphragm/check valve sealing surface on the flexible central portion is planar and no means are provided to focus the fluid pressure on the area surrounding the inlet air holes. If the diaphragm is covered with fluid, leakage may occur past the interface between the diaphragm and planar sealing surface and out the air holes.

U.S. Pat. No. 4,159,790 discloses a dispensing cap with a dual valve arrangement. To allow fluid flow with this patent, the container must be in an upright position. Fluid is made to flow by deforming the sides of the container thus continuous fluid flow is prohibited. Once the deforming force is remove fluid flow stops. The exit port for the fluid contains a fluid check valve that will dispensed the fluid in a spray that is nondirectional. This prevents the fluid from being delivered in a uniform stream.

U.S. Pat. No. 4,340,157 discloses a dispenser cap with a dual valve arrangement to allow air into the dispenser through one valve and fluid to exit through another valve. However, the exiting fluid and the inlet air both use the same passageway for egress or ingress. With this arrangement continuous flow of fluid is prohibited. Also the container must be in an upright position and it must be deformed to allow fluid flow.

U.S. Pat. No. 4,420,101 discloses a dispenser cap with a dispensing opening that allows fluid to exit the container and air to enter the container through the same passage. With this arrangement continuous fluid flow is prohibited. Also the container must be in an inverted position to allow fluid to flow. Additionally, the valve requires a special mold that adds to the manufacturing cost.

U.S. Pat. No. 4,506,809 discloses a dispensing cap with a preloaded annular valve member that acts to allow air back into the container through the same passageway that fluid exits the container. With this arrangement continuous flow of fluid is prohibited. This patent requires a specially designed annular valve member that must be placed into the valve seat in a certain orientation and with a predetermined spring load. Both can make manufacture and assembly costly. In addition, the dispensing valve only has two positions and the container must be inverted in order to allow fluid flow. In operation, the walls of the container must be deformed causing the fluid to squeeze past the spring loaded diaphragm making the fluid spray out of the cap opening nondirectionally.

U.S. Pat. No. 4,513,891 discloses a container with a spray nozzle arrangement. To allow fluid flow with this patent, the container must be in an upright position. The walls of the container must be deformed to make fluid exit the container. The fluid exits the nozzle in a misty spray and is nondirectional. This spray nozzle/two way check valve requires a molded part which adds to the manufacturing costs. The air inlet shown in this patent may slightly leak because the fluid pressure against the check valve diaphragm is not concentrated around the air inlet holes when pressure in applied to the spray bottle. An overcap is provided to prevent debris from entering into the two way check valve but this overcap is detachable and can be misplaced.

U.S. Pat. No. 4,852,781 discloses a fluid delivery system with an air ingress passageway that is separate from the fluid exit passageway. To allow fluid flow with this patent, the container must be in an upright position. Also, the fluid can exit though the air inlet passageway if the container is inverted. Only one operating mode is allowed with this patent. The delivery tubing is connected directly to the cap of the container making it difficult to install and refill the container. The L shaped air passageway is difficult to manufacture.

U.S. Pat. No. 5,215,231 discloses a bottle with a special exit port that when pulled out closes preventing fluid flow and when pushed in opens allowing fluid flow. An air inlet check valve is provided adjacent to the fluid exit port. This patent requires the container to be inverted. If the air inlet valve leaks, it will leak in an undesirable location. Furthermore, the cap and bottle were designed to interact with a special bottle cage that will prevent any debris from entering into the air relief valve or the exit port. As a stand alone unit, the cap and bottle provide no means to prevent any debris from entering the air relief valve.

U.S. Pat. No. 5,472,122 discloses a container cap with an air inlet valve arrangement. Only one mode of operation is provided. This patent requires the container to be inverted to allow fluid flow. The air inlet valves shown do not provided for any means to prevent incoming air from being entrained back into the exiting fluid stream. Additionally, the sealing surfaces for the flange diaphragm are planar and may allow fluid to leak out of the air inlet holes. There is no structural means shown to focus the fluid pressure on the flange diaphragm around the perimeter of the air inlet holes. Also no means are provided to prevent debris from entering into the air inlet valve.

OBJECTS AND SUMMARY OF THE INVENTION

The present invention overcomes or improves upon the prior art by providing a container cap that allows air into the container as fluid exits.

Another object of the invention is to provide an air inlet valve around the exiting fluid port. The air inlet valve has structures that prevent fluid leakage out of the air inlet holes and structures to channel the incoming air away from the exiting fluid thus preventing the air from being entrained into the fluid stream.

Another object of the invention is to provide a new check valve member that is cylindrical in shape. Unlike the prior art of U.S. Pat. No. 5,472,122 or U.S. Pat. No. 4,102,476, this member requires no additional parts to lock it into place.

Another object of the invention is to provide a cap that allows the fluid to exit the container when it is in an upright position or when it is in an inverted position.

These and other objects are achieved in accordance with the invention by providing a valve assembly having a base with an outlet opening for liquid from the container and a vent hole for air, a valve member movable between open and closed positions relative to the base for controlling passage of liquid through the outlet opening and covering the vent hole when the valve member is in the closed position, and a resiliently deformable sealing member which allows air to pass through the air hole when pressure within the container is less than the pressure outside the container.

BRIEF DESCRIPTION OF THE DRAWINGS

FIG. 1 is an exploded isometric view of one embodiment of a vented valve assembly according to the invention.

FIG. 2 is an exploded vertical sectional view of the embodiment of FIG. 1.

FIGS. 3A and 3B are operational views of the embodiment of FIG. 1.

FIG. 6 is an exploded isometric view of another embodiment of a vented valve assembly according to the invention.

FIG. 7 is an exploded vertical sectional view of the embodiment of FIG. 6.

DETAILED DESCRIPTION

Figure 4:
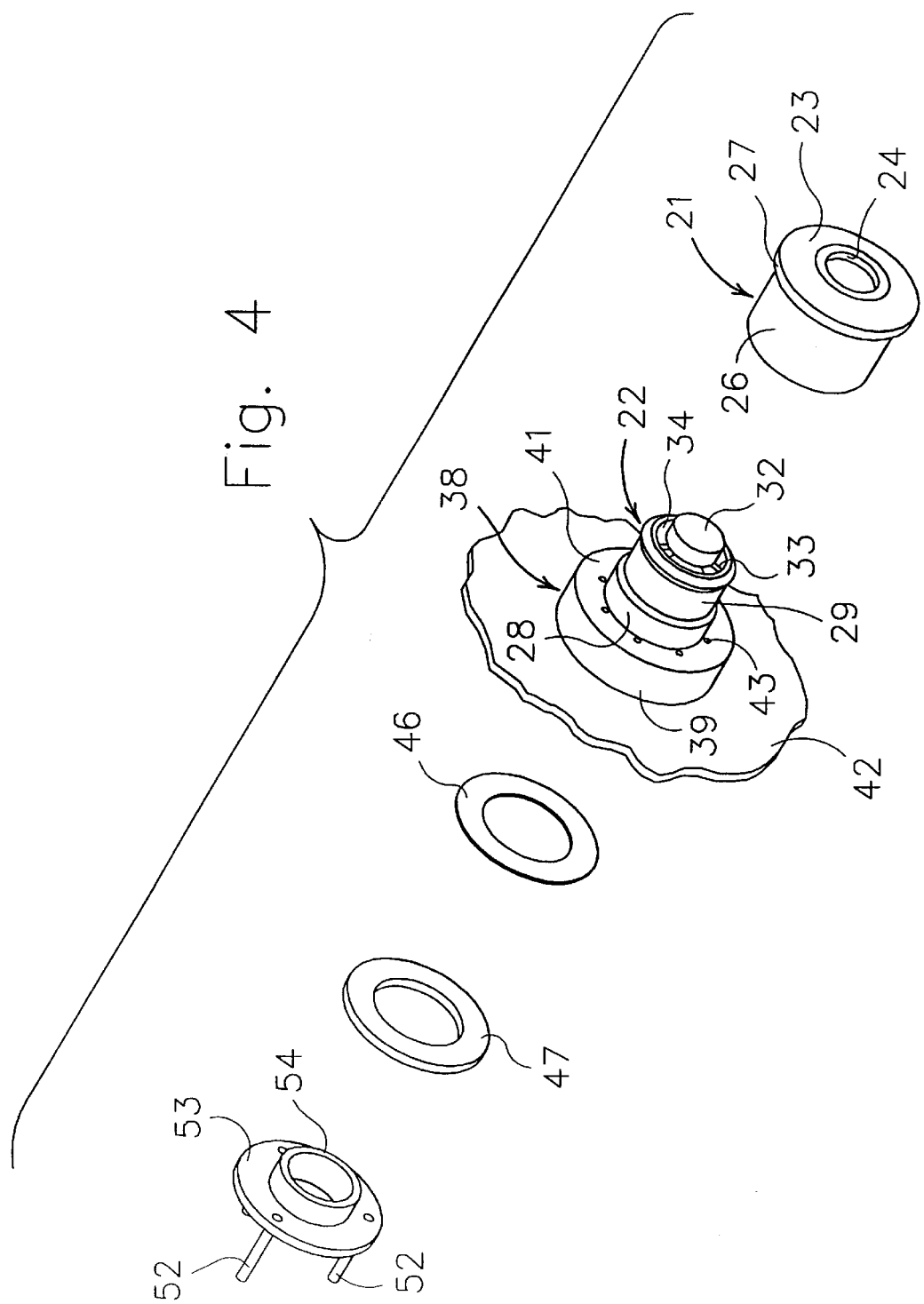
FIG. 4 is an exploded isometric view of another embodiment of a vented valve assembly according to the invention.

In the drawings, the invention is illustrated in connection with a push-pull dispensing valve having a valve member in the form of a cap 21 slidably mounted on a nozzle 22 for movement between open and closed positions.

In the embodiment of FIGS. 1–3, Cap 21 has a generally annular end wall 23 with a central opening 24 and a cylindrical side wall or skirt 26. A radially extending flange 27 at the outer end of the cap facilitates gripping of the cap for movement between the open and closed positions.

Nozzle 22 has a cylindrical side wall 28 with an outer section 29 of decreased diameter and an axially extending passageway 31 formed therein. A plug 32 is mounted on radially extending vanes 33 at the outer end of the passageway, with openings 34 between the vanes. When the cap is in the closed position, plug 32 is received in opening 24, with the side wall of the plug in sealing engagement with the end wall of the cap. When the cap is in the open position, the end wall is spaced away from the plug, and liquid can flow out of the container through openings 34 and 24. Outward movement of the cap is limited by a pair of radially projecting flanges 36, 37 on the cap and nozzle.

The base portion of the valve assembly also includes a housing 38 which has a cylindrical side wall 39 and an annular end wall 41 at the base of the nozzle. The valve assembly is mounted on the lid 42 of the container, with the housing and nozzle being formed as an integral part of the lid. In the embodiment illustrated, side wall 39 extends through the top wall of the lid, with housing 38 being partly above the top wall and partly below it.

A plurality of vent holes 43 are formed in wall 41 at the base of the nozzle. Those holes extend in an axial direction and open into an annular groove 44 on the outer side of the wall. When the cap is in its closed position, the lower portion of skirt 26 is received in the groove to seal the vent holes from the outside and prevent dirt and/or other debris from getting into them.

Means is provided for permitting air to enter the container through the vent holes and for preventing water from leaking out through them. That means consists of a set of washers 46–48 which are mounted in housing 38. Washer 46 is a resiliently deform able washer of relatively low durometer value, washer 47 is fabricated of a material of lesser density than the liquid in the container, and washer 48 is relatively rigid. The upper surface of washer 46 seats against a plurality of annular seats 49 which surround the vent holes on the inner side of wall 41. The annular seats 49 act to focus any fluid pressure on washers 46, 47 around the perimeter of the air inlet holes. The washers are retained in the housing 38 by an annular flange or lip 51 at the lower end of side wall 39.

When the container is in a upright position and the level of the liquid is high enough to spill out the vent holes, the buoyancy of washer 47 holds washer 46 in sealing engagement with seats 49 to prevent the liquid from entering the vents. When the container is in an inverted position, washer 46 engages the seats and prevents liquid from leaking out through the vent holes. As liquid is withdrawn through the discharge openings and the pressure inside the container starts to drop, washer 46 unseats from seats 49, allowing air to enter the container through the vent holes and thereby preventing the formation of a vacuum within the container.

Figure 5:
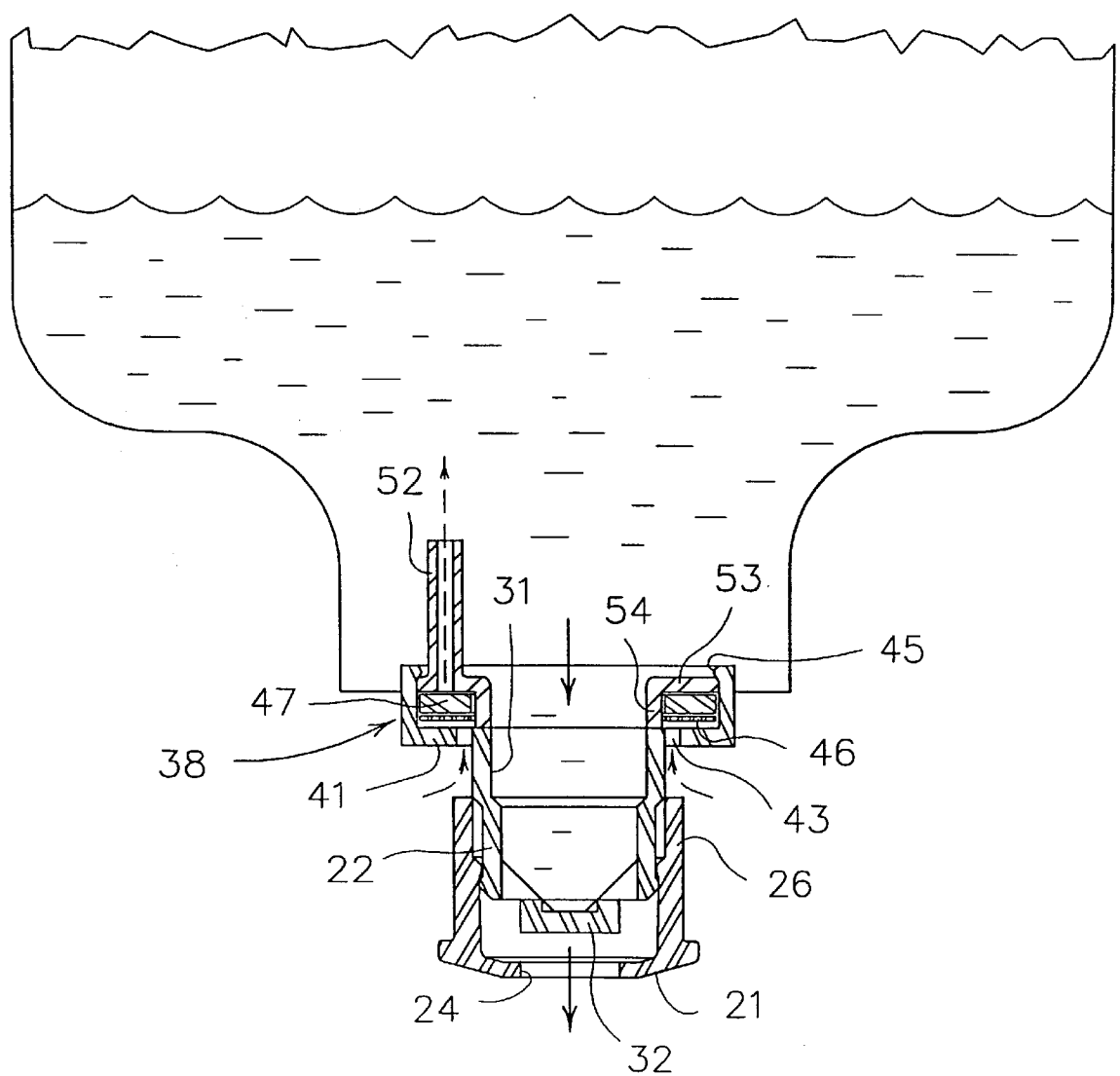
FIG. 5 is a cross-sectional view of the embodiment of FIG. 4.

The embodiment of FIGS. 4–5 is similar to the embodiment of FIGS. 1–3, and like reference numerals designate corresponding elements in the two embodiments. In the embodiment of FIGS. 4–5, the groove at the base of the nozzle is eliminated, and the inner end of cap skirt 26 bears against the face of housing wall 41 to seal the vent holes 43 from the outside.

This embodiment also includes means for preventing air entering the container through the vent holes from becoming entrained in the liquid passing out through the discharge openings. That means includes a plurality of tubes or spouts 52 which extend into the container from housing 38. In this embodiment, the inner side of the housing is closed by an annular end wall 53 and an inner side wall 54, with the vent tubes extending from wall 53 in a direction generally parallel to the axis of the nozzle. The tubes are formed as an integral structure with walls 53, 54, and that structure along with washers 46, 47 is retained in the housing 38 by an annular flange or lip 45 at the lower end of side wall 39. The length of side wall 54 is such that when the structure is snapped into the housing 38 past lip 45, a substantially leak-tight seal is made between the structure and the housing.

Air entering the container through vent holes 43 passes through tubes 52 and is thus directed away from the liquid flowing out of the container through the discharge passageway in nozzle 22.

Figure 8A:
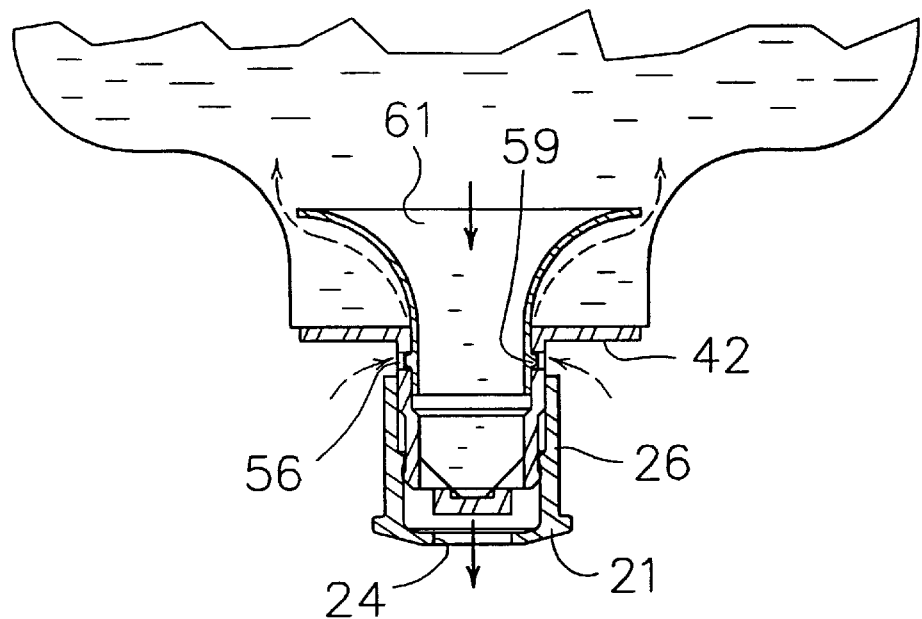
FIGS. 8A and 8B are operational views of the embodiment of FIG. 7.
Figure 8B:
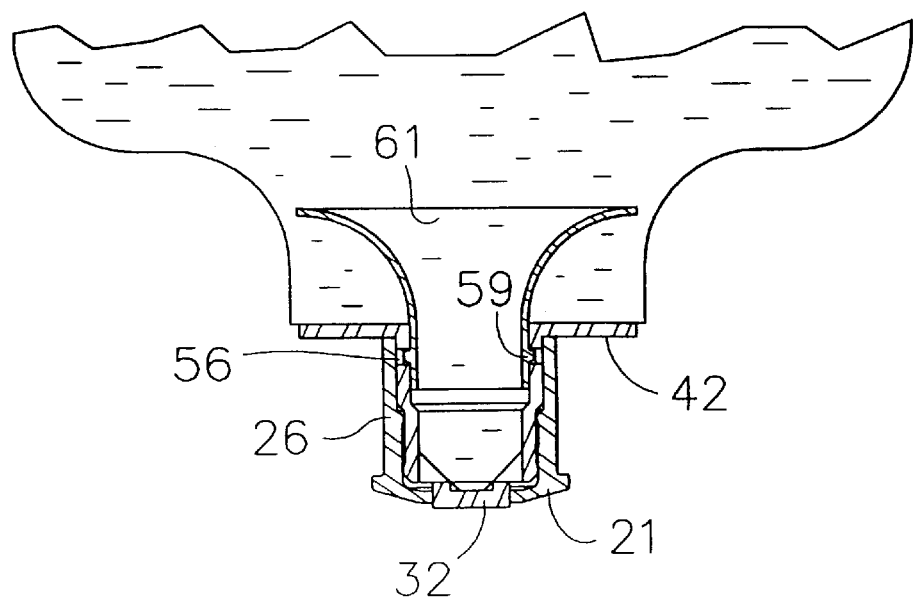

In the embodiment of FIGS. 6–8, nozzle 22 extends directly from the top wall 42 of the container lid, and vent holes 56 extend radially through the side wall 28 of the nozzle. When cap 21 is in the closed position, skirt 26 covers the vent holes and thereby seals them on the outside.

Vent holes 56 open into an annular groove 57 on the inside of side wall 28. A resiliently deformable sleeve 58 is disposed coaxially within side wall 28 and has a radially projecting rib or flange 59 which is received in groove 57 to hold the sleeve 58 in place. A leak-tight seal is made between the inside surface 55 of side wall 28 and the outside surface of sleeve 58. The lower portion 61 of sleeve 58 is flared and extends into the container about the axis of the nozzle.

As the pressure within the container starts to drop, sleeve 58 deforms or flexes, and the outside surface 60 of sleeve 58 slightly separates from inside surfaces 55 of wall 28, allowing air to enter the container through the vent holes. The web arrangement 50 (shown only in FIG. 6) prevents sleeve 58 from buckling inwardly due to a high ingress of air into the container. The flared portion of the sleeve serves as a deflector which directs the air away from the passageway in the nozzle so that the air does not become entrained in the liquid being discharged from the container.

Figure 9:
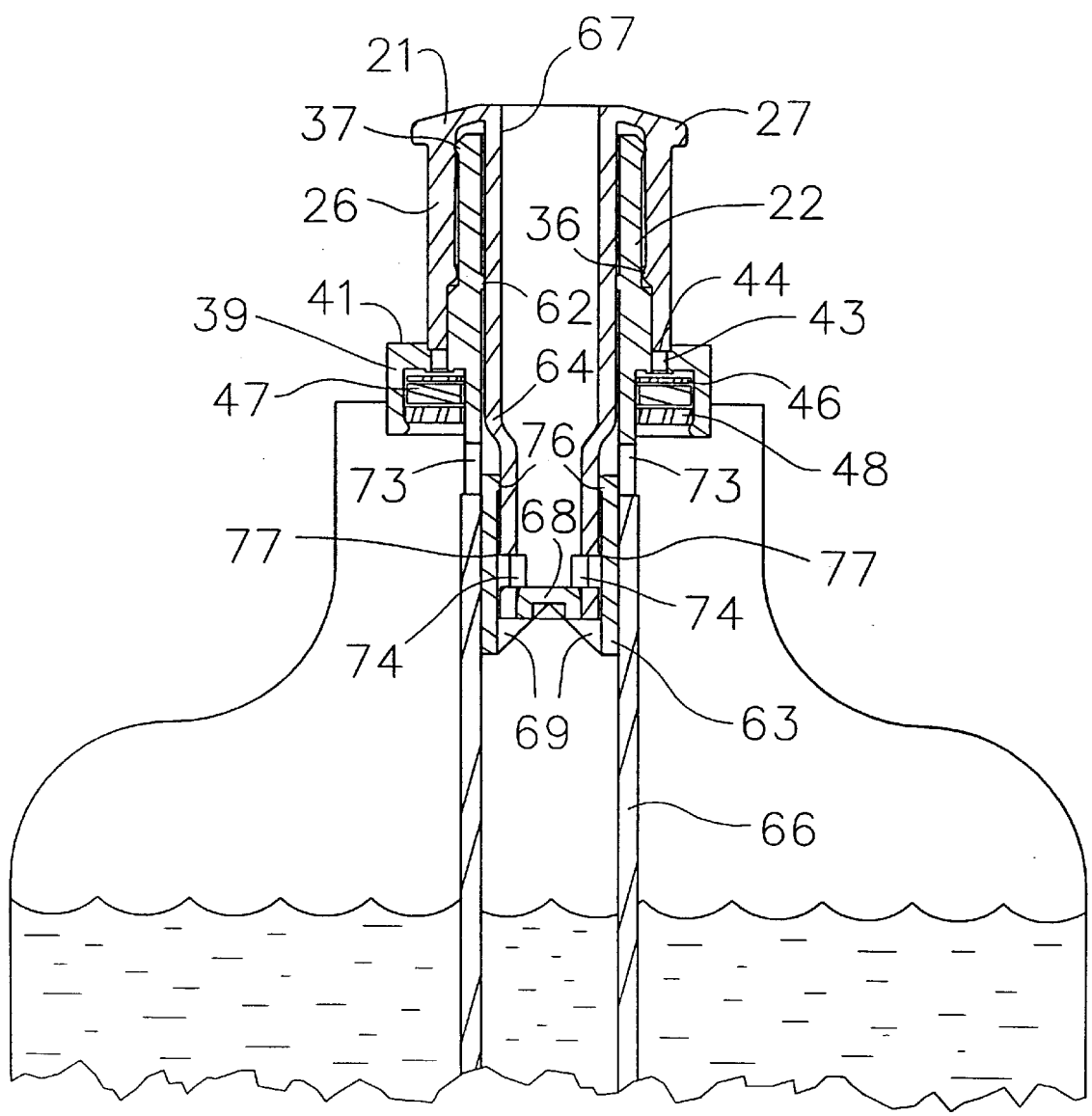
FIG. 9 is a vertical sectional view of another embodiment of a vented valve assembly according to the invention.

In the embodiment of FIGS. 9–10, the body of the valve assembly includes a depending hollow stem 63 which extends into the container, and the cap includes a hollow core 64 which extends into the stem. Annular detent 62 on the inside wall of nozzle 22 makes a snug leak-tight seal with the outside surface of hollow core 64. A flexible tube 66 is mounted on the stem and extends into the lower portion of the container. An axial passageway 67 extends through the hollow core, and a plug 68 is mounted on stem 63 by radial vanes 69 at the lower end of the passageway. Orifices 73, 74 are formed in the side walls of stem 63 and core 64.

Figure 10A:
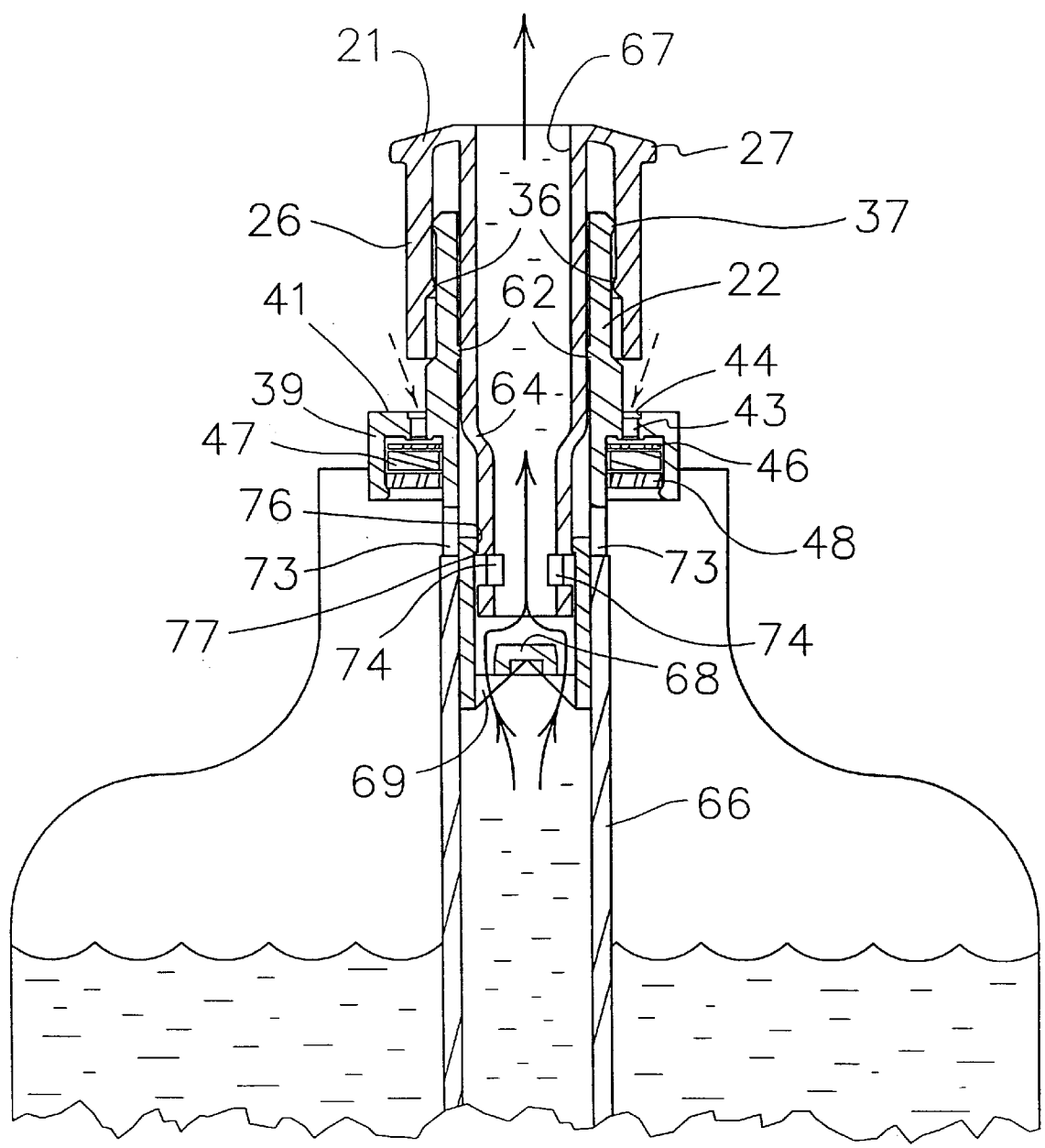
FIGS. 10A and 10B are operational views of the embodiment of FIG. 9.
Figure 10B:
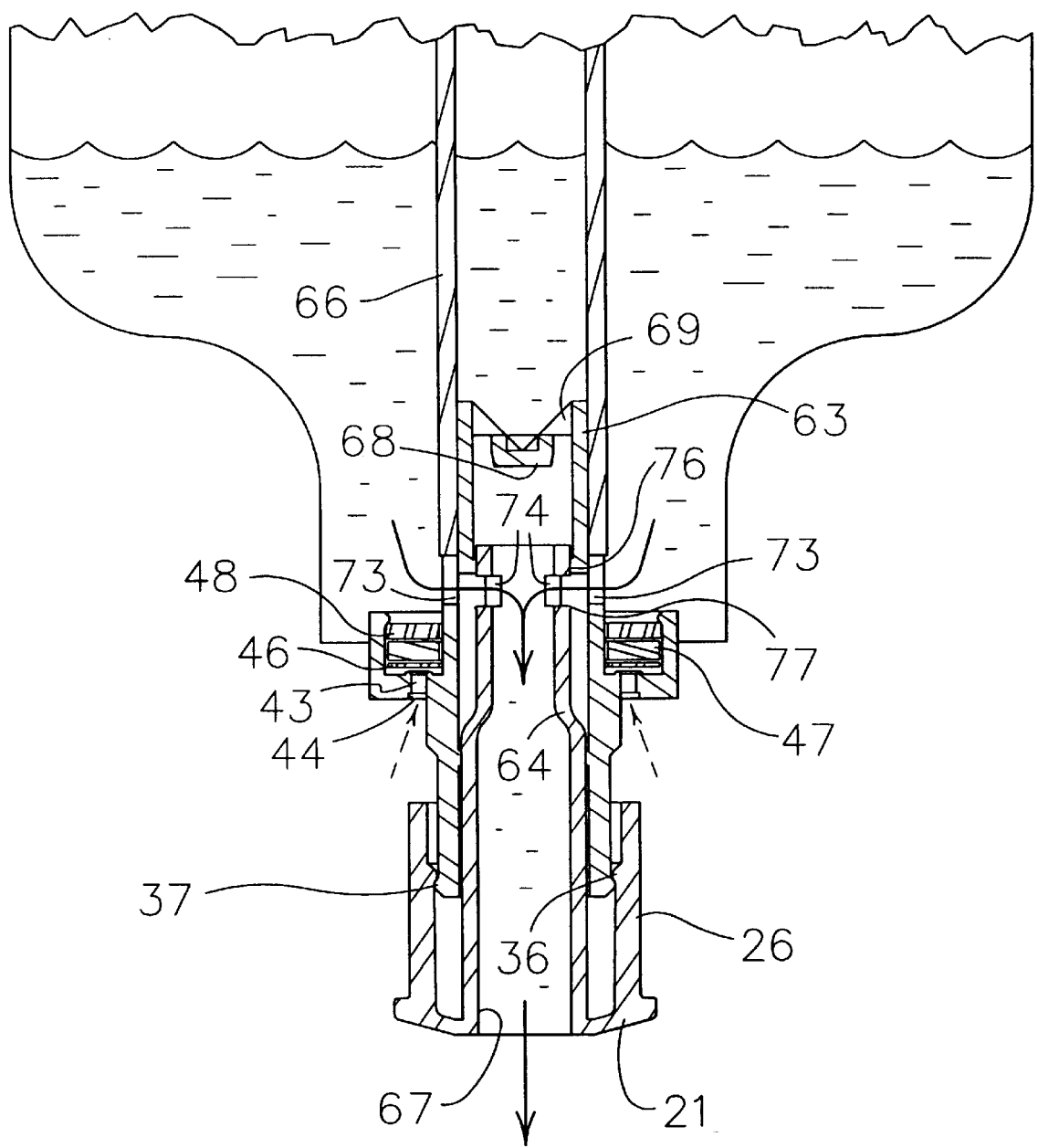

Cap 21 is movable between a closed position which is illustrated in FIG. 9, a first open position which is illustrated in FIG. 10A, and a second open position which is illustrated in FIG. 10B. Detent flanges 76, 77 on the stem and core hold the cap in the first open position, and flanges 36, 37 hold it in the second.

In the closed position (FIG. 9), the lower portion of cap skirt 26 seats in groove 44 to seal vent holes 43, orifices 73, 74 are not in communication with each other, and the lower portion of core 64 seats against plug 68 to prevent communication between tube 66 and passageway 67. Annular detents 62, 76 make leak-tight seals with outside wall surfaces of hollow core 64.

In the first open position (FIG. 10A), vent holes 43 are uncovered, the lower portion of core 64 moves away from plug 68 to provide communication between tube 66 and passageway 67, and orifices 73, 74 remain closed. With the container in an upright position, liquid can be drawn through tube 66 and a delivery tube (not shown) connected externally to the valve assembly. Air can enter the container through the vent holes to prevent a vacuum from forming and interfering with the discharge of liquid from the container.

In the second open position (FIG. 10B), vent holes 43 are once again uncovered, and orifices 73, 74 are aligned to provide communication between the upper portion of the container and passageway 67. With the container in an inverted position, liquid will flow out of the container through the aligned orifices 73, 74 and the discharge passageway 67, and air will enter the container through vent holes 43 to prevent the formation of a vacuum. As in the embodiment of FIGS. 1–3, washers 46–48 allow air to enter the container, but prevent liquid from escaping through the vent holes.

Figure 11:
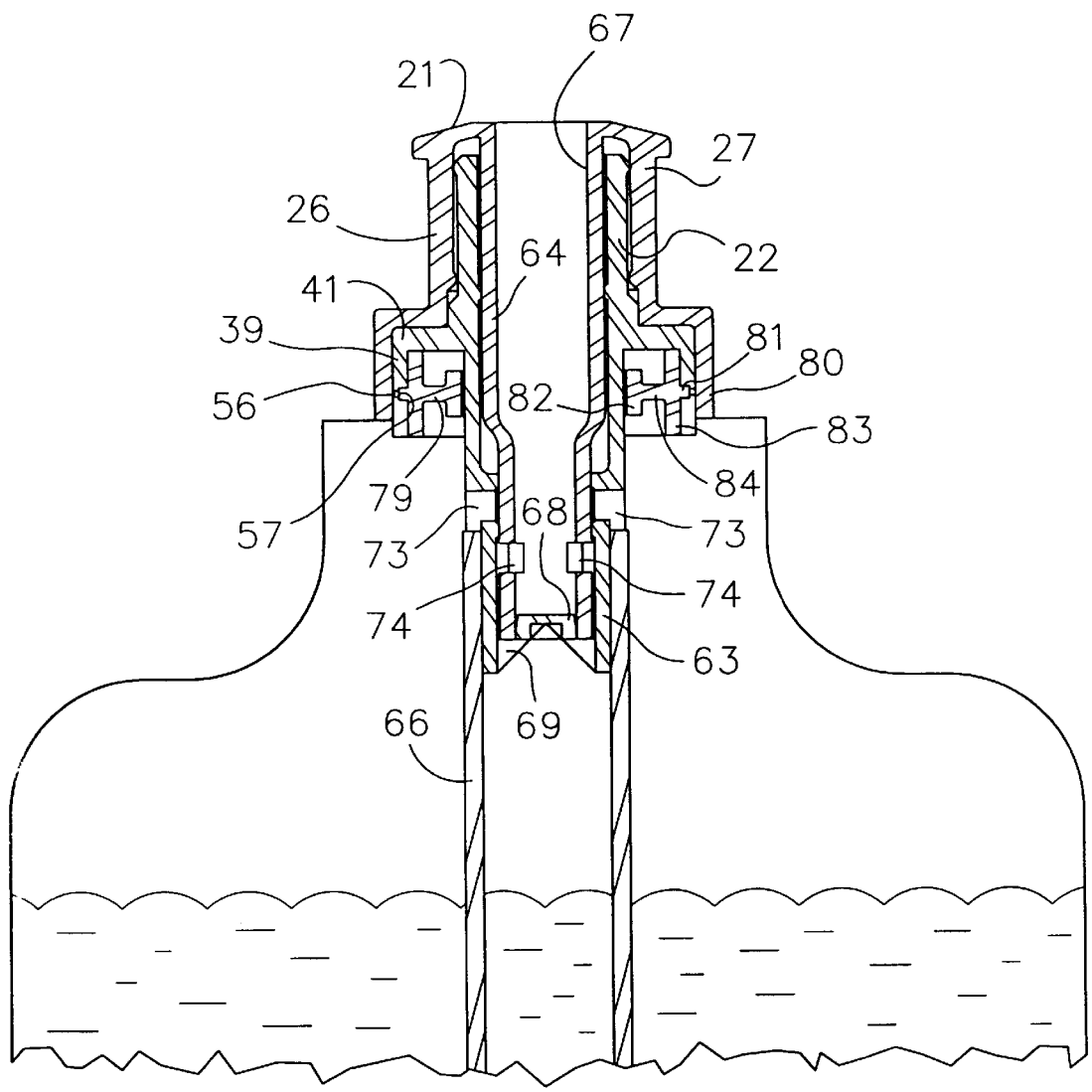
FIG. 11 is a vertical sectional view of another embodiment of a vented valve assembly according to the invention.
Figure 12A:
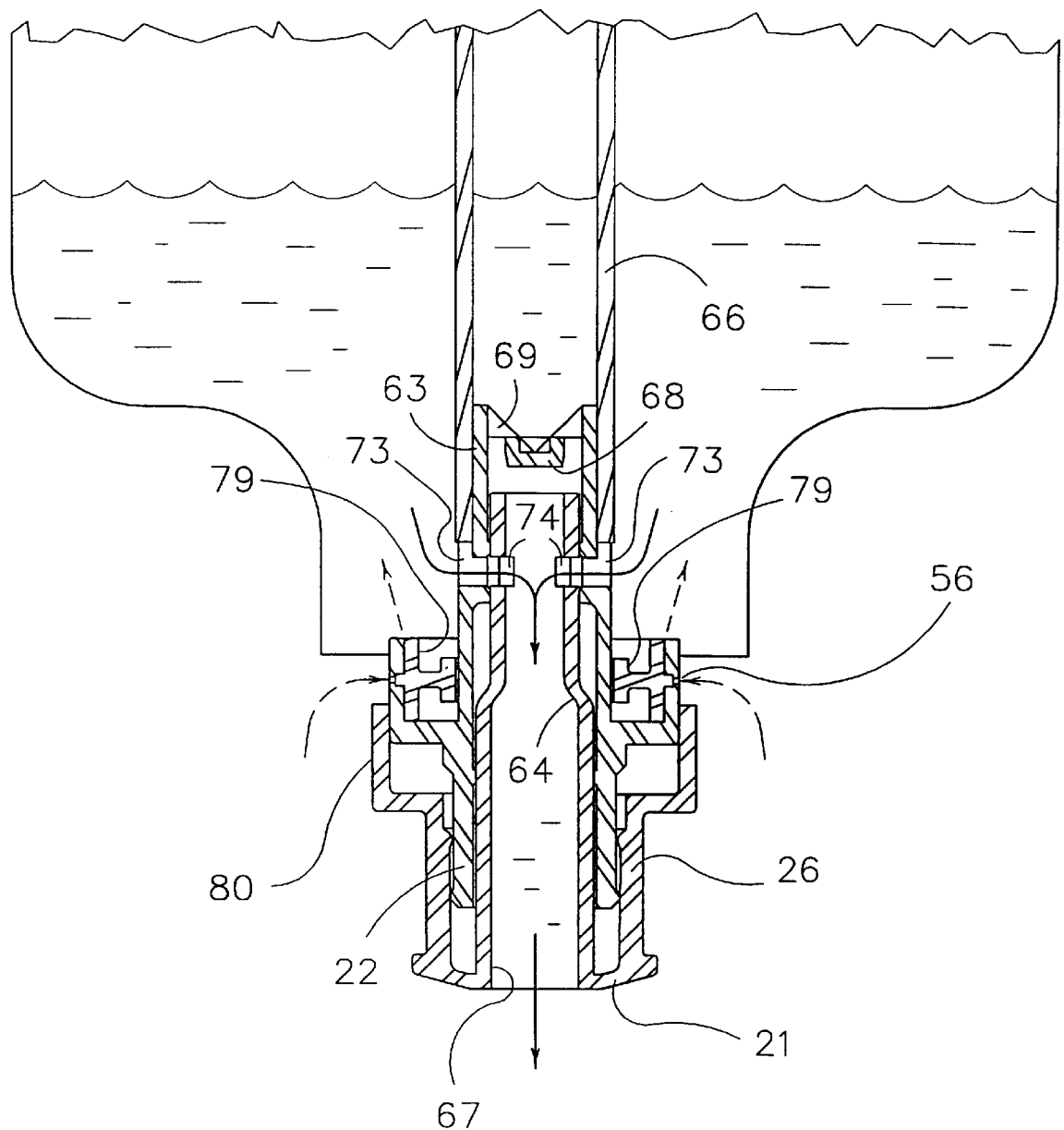
FIGS. 12A and 12B are operational views of the embodiment of FIG. 11.
Figure 12B:
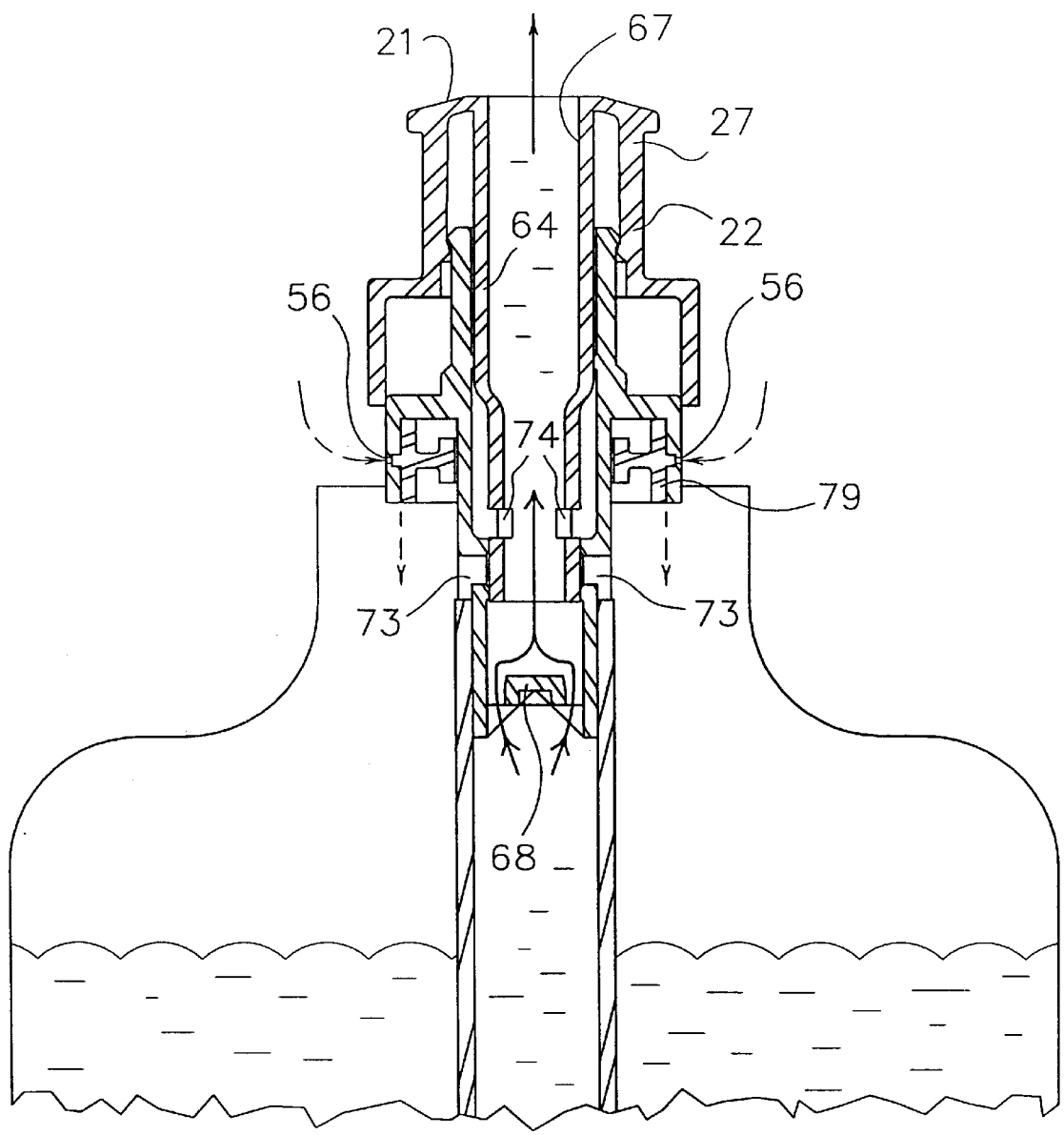

The embodiment of FIGS. 11–12 includes another three-way valve assembly which permits the container to be used in either an upright position or an inverted position. In this embodiment, vent holes 56 are located in the side wall 39 of housing 38, and the flow of air through them is controlled by a resilient sleeve 79 which is generally similar to sleeve 58 in the embodiment of FIGS. 6–8. This sleeve has a radially projecting rib or flange 81 which is received in groove 57 on the inner side of wall 39. It also has an inner wall 82 which encircles the side wall of stem 63, a cylindrical outer wall 83 which engages the inner side of side wall 39, and a web 84 which extends between the inner and outer walls. The skirt of cap 21 has a section 80 of increased diameter toward its lower end which covers the vent holes when the cap is in the closed position.

The embodiment of FIGS. 11–12 also differs from the embodiment of FIGS. 9–10 with regard to the location of orifices 73, 74. In this embodiment, orifices 73 are located at a lower position in stem 63, and communication between them is provided when the cap is in its intermediate (first open) position.

With the cap in the closed position (FIG. 11), the lower portion of the cap skirt 26 covers vent holes 56, orifices 73, 74 are not in communication with each other, and the lower portion of core 64 seats against plug 68 to prevent communication between tube 66 and passageway 67.

In the first open position (FIG. 12A), vent holes 56 are uncovered, and orifices 73, 74 are aligned to provide communication between the upper portion of the container and passageway 67. With the container in an inverted position, liquid will flow out of the container through the orifices and the discharge passageway, and air will enter the container through vent holes 56 to prevent the formation of a vacuum. Sleeve 79 allows air to enter the container, but prevent the liquid from escaping through the vent holes. If sleeve 79 is deformed too much by the entering air, inner wall 82 of sleeve 79 will be pushed up against the outside wall of stem 63. Thus, the webbed structure formed by inner wall 82 and adjoining web 84 prevents sleeve 79 from buckling inwardly.

In the second open position (FIG. 12B), vent holes 56 are uncovered, the lower portion of core 64 is away from plug 68 to provide communication between tube 66 and passageway 67, and orifices 73, 74 are once again closed. With the container in an upright position, liquid can be drawn out of the container through tube 66 and a delivery tube (not shown) connected externally to the valve assembly, and air can enter the container through the vent holes.

Figure 13:
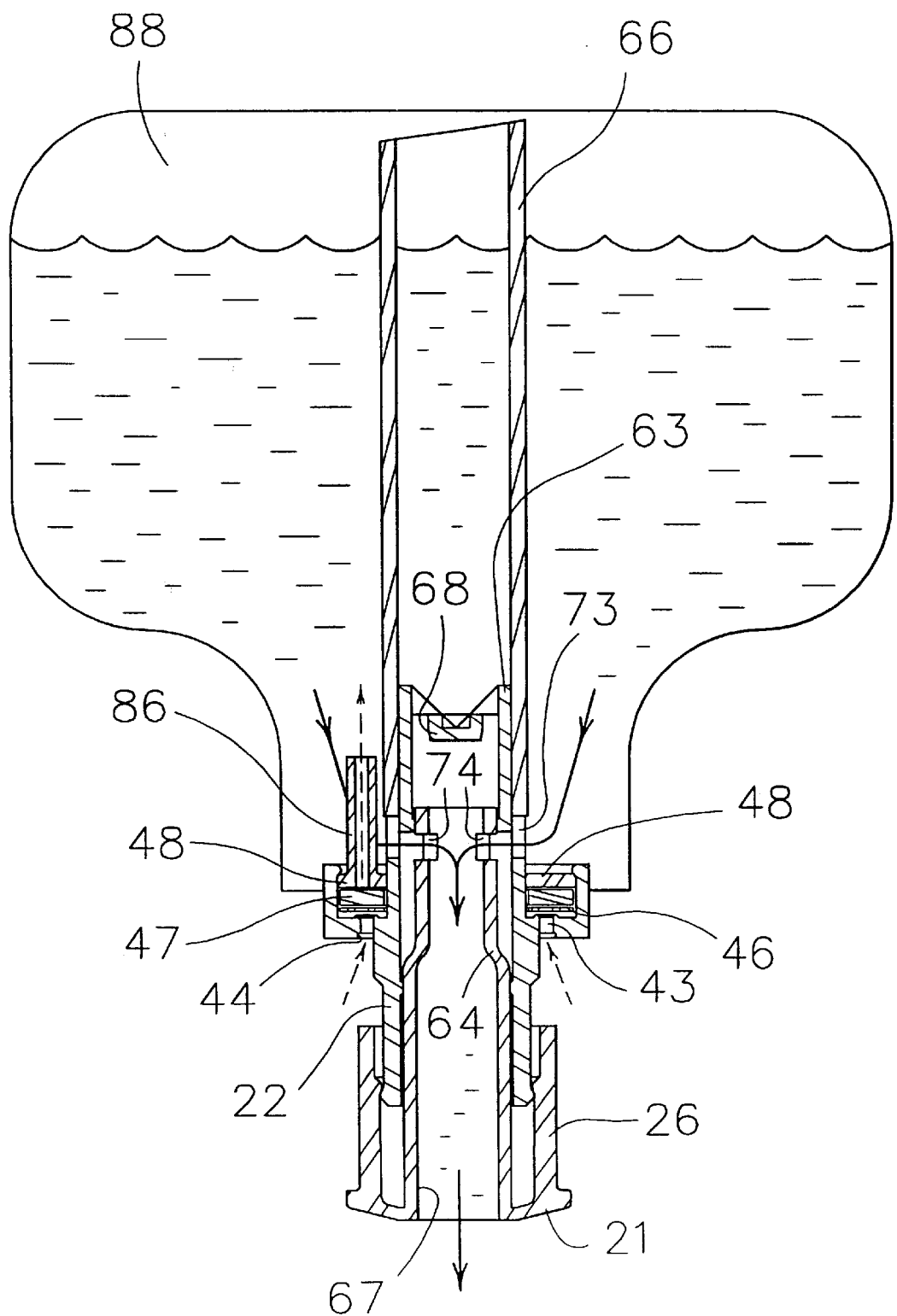
FIG. 13 is a vertical sectional view of another embodiment of a vented valve assembly according to the invention.

The embodiment of FIG. 13 is similar to the embodiment of FIGS. 9–10, with the addition of vent tubes 86 for directing the incoming air away from orifices 73, 74 so that it will not become entrained in the liquid flowing out of the container. Vent tubes 86 are similar to vent tubes 52 in the embodiment of FIGS. 4–5, and are formed integrally with washer 48. They extend in a direction parallel to stem 63 and are spaced peripherally about it. They extend beyond orifices 73 and direct the incoming air away from the orifices.

Figure 14:
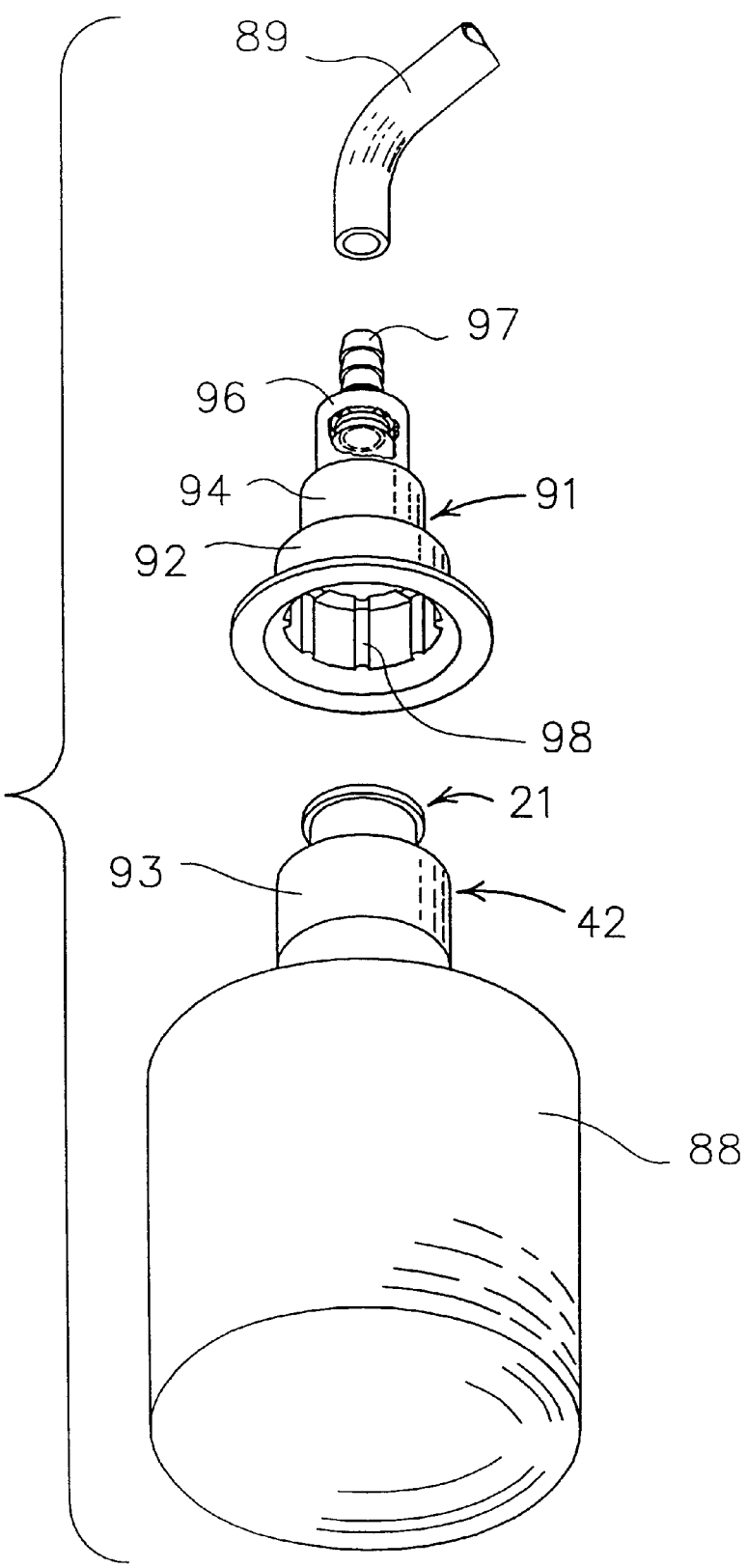
FIG. 14 is an exploded isometric view, partly broken away, of the embodiment of FIG. 13 in combination with a delivery tube and boot.

In FIG. 14, the container of FIG. 13, designated by the reference numeral 88, is illustrated in connection with a delivery tube 89 and a boot 91. The boot is fabricated of a flexible material and has a lower section 92 which fits over the side wall 93 of the container lid, a central section 94 which receives cap 21 of the valve assembly, and an upper section 96 with a barbed connector 97 on which delivery tube 89 is mounted. The lower section has longitudinally extending internal ribs 98 which engage the side wall of the lid and provide air gaps so that air can get to the vent holes. Central section 94 provides a fluid-tight seal with cap 21, and delivery tube 89 communicates with passageway 67 in the cap. The delivery tube extends from the container to the point where the liquid is to be dispensed, e.g. the mouth of a bike rider, and can be provided with a suitable flow control valve (not shown) at its distal end.

The delivery tube and boot can be used with any of the embodiments disclosed herein. With the embodiments having a two-way valve (FIGS. 1–8), the container is placed in an inverted position, and with the valve in its open position, liquid can be drawn from the container by sucking on the tube. With a three-way valve assembly (FIGS. 9–13), liquid can be drawn through the tube with the container in either an upright position or an inverted position. In either position, air can flow between the ribs in the boot to the vent holes in the valve assembly.

It is apparent from the foregoing that a new and improved vented valve assembly has been provided. While only certain presently preferred embodiments have been described in detail, as will be apparent to those familiar with the art, certain changes and modifications can be made without departing from the scope of the invention as defined by the following claims.

I claim:

1. A vented valve assembly for use on a liquid container, comprising: a base having an outlet opening for egress of liquid from the container and a vent hole for ingress of air into the container, a valve member movable between open and closed positions relative to the base for controlling passage of liquid through the outlet opening and covering the vent hole when the valve member is in the closed position and a resilient, deformable sealing member engaging a seating surface surrounding the vent hole and being displaceable away from the seating surface to allow air to pass through the vent hole when pressure within the container is less than pressure outside the container.

2. The valve assembly of claim 1 wherein the base includes an axially extending nozzle and an axially facing annular groove at the base of the nozzle, with the vent hole opening into the groove, and the valve member has an outer skirt which slides over the nozzle and seats in the groove when the valve member is in the closed position.

3. The valve assembly of claim 1 wherein the base includes an axially extending nozzle through which the vent hole extends, and the valve member has an outer skirt which is disposed coaxially of the nozzle and covers the vent hole when the valve member is in the closed position.

4. The valve assembly of claim 1 including means for directing air passing through the vent hole away from the outlet opening to prevent the air from becoming entrained in liquid passing through the outlet opening.

5. The valve assembly of claim 4 wherein the means for directing air away from the outlet opening comprises a tube which communicates with the vent hole and extends into the container.

6. The valve assembly of claim 4 wherein the means for directing air away from the outlet opening comprises a deflector disposed coaxially of the outlet opening.

7. The valve assembly of claim 1 together with a boot which fits over the assembly and has a tube extending therefrom in communication with the outlet opening for carrying liquid from the container.

8. A valve assembly or use with a liquid container, comprising a base, an outlet opening extending through the base for egress of liquid from the container, a tube communicating with the outlet opening and extending from the base into a lower portion of the container, a valve member movable between a close position and two open positions relative to the base for controlling passage of liquid through the outlet opening, the valve member and base including means for closing the outlet opening orifices in the valve member and the base which are aligned to provide communication between the interior of the container and the outlet opening when the valve member is in its first open position so that liquid can flow from the container through the orifices and the outlet opening when the container is in an inverted position, and means preventing communication between the orifices when the valve member is in its second open position but permitting liquid to be drawn through the tube to the outlet opening when the container is in an upright position.

9. The valve assembly of claim 8 wherein the base includes a hollow stem which extends into the container and the valve member includes a hollow core which slides axially within the stem, with the outlet opening extending axially through the core, a first one of the orifices opening through a wall of the stem and a second one of the orifices extending through a wall of the core, communication between the orifices being provided only when the orifices are aligned with each other.

10. The valve assembly of claim 8 together with a boot which fits over the assembly and has a tube extending therefrom in communication with the outlet opening for carrying liquid from the container.

11. The valve assembly of claim 8 including a vent hole in the base for ingress of air into the chamber.

12. The valve assembly of claim 11 wherein the valve member and base include means for covering the vent hole when the valve member is in the closed position.

13. The valve assembly of claim 11 including a resilient sealing member engaging a seating surface surrounding the vent hole and being deformable away from the seating surface to allow air to pass through the vent hole when pressure within the container is less than pressure outside the container.

14. The valve assembly according to claim 8 in combination with a boot which fits over the valve assembly and has an outlet tube extending therefrom for carrying liquid from the liquid container.

15. A vented valve assembly for use on a liquid container, comprising: a base having an outlet opening for egress of liquid from the container and a vent hole for ingress of air into the container, a valve member movable between open and closed positions relative to the base for controlling passage of liquid through the outlet opening and covering the vent hole when the valve member is in the closed position, a movable resilient sealing member for controlling air movement through said vent hole and structural means for focusing the liquid pressure on the resilient sealing member around the portion of the resilient sealing member that covers the perimeter of the vent hole in order to decrease liquid leaking through the air vent hole.

16. The vented valve assembly according to claim 15 in combination with a boot which has an outlet tube extending therefrom in communication with the outlet opening for carrying liquid from the liquid container.

17. A valve assembly for use with a liquid container, comprising: a base, an outlet opening extending through the base for egress of liquid from the container, a tube communicating with the outlet opening and extending from the base into a lower portion of the container, a valve member movable between two open positions relative to the base for controlling passage of liquid through the outlet opening, the valve member and base cooperable when the valve member is in one of said open positions to allow liquid flow from the container only through said tube and cooperable when the valve member is in the other of said open positions for permitting liquid to flow from the interior of said container surrounding said tube.

* * * * *